United States Patent
Kaise et al.

(10) Patent No.: US 7,325,933 B2
(45) Date of Patent: Feb. 5, 2008

(54) PROJECTION TYPE VIDEO DISPLAY APPARATUS

(75) Inventors: Naoki Kaise, Higashiosaka (JP); Koji Muraoka, Nishinomiya (JP); Toru Kirimura, Tsushima (JP)

(73) Assignee: Sanyo Electric Co., Ltd, Osaka (JP)

( * ) Notice: Subject to any disclaimer, the term of this patent is extended or adjusted under 35 U.S.C. 154(b) by 176 days.

(21) Appl. No.: 11/197,436

(22) Filed: Aug. 5, 2005

(65) Prior Publication Data

US 2006/0028624 A1 Feb. 9, 2006

(30) Foreign Application Priority Data

Aug. 9, 2004 (JP) ............................. 2004-232211
Sep. 21, 2004 (JP) ............................. 2004-273565

(51) Int. Cl.
*G03B 21/14* (2006.01)
(52) U.S. Cl. .......................... 353/97; 353/122; 353/28
(58) Field of Classification Search .................. 353/28, 353/122, 97; 348/586, 590, 607
See application file for complete search history.

(56) References Cited

U.S. PATENT DOCUMENTS

| | | | |
|---|---|---|---|
| 6,361,173 B1* | 3/2002 | Vlahos et al. | 353/97 |
| 6,460,999 B1* | 10/2002 | Suzuki | 353/79 |
| 6,575,581 B2* | 6/2003 | Tsurushima | 353/121 |
| 6,598,979 B2* | 7/2003 | Yoneno | 353/122 |
| 6,789,903 B2* | 9/2004 | Parker et al. | 353/28 |
| 6,840,627 B2* | 1/2005 | Olbrich | 353/42 |
| 6,984,039 B2* | 1/2006 | Agostinelli | 353/28 |
| 7,018,055 B2* | 3/2006 | Suzuki | 353/122 |
| 7,111,940 B2* | 9/2006 | Vlahos | 353/28 |
| 7,210,786 B2* | 5/2007 | Tamura et al. | 353/28 |
| 2002/0159039 A1 | 10/2002 | Yoneno | |
| 2004/0165154 A1* | 8/2004 | Kobori et al. | 353/69 |

FOREIGN PATENT DOCUMENTS

| | | |
|---|---|---|
| EP | 1 513 008 A1 | 3/2005 |
| GB | 2 398 693 A | 8/2004 |
| JP | 6-347748 | 12/1994 |
| JP | 2000-19636 | 1/2000 |
| JP | 2000-305481 | 11/2000 |
| JP | 2004-348078 A | 12/2004 |
| WO | WO 01/84231 A1 | 11/2001 |

OTHER PUBLICATIONS

British Search Report dated Jan. 26, 2006, corresponding British Patent Application No. GB0516273.0.

* cited by examiner

*Primary Examiner*—William C. Dowling
(74) *Attorney, Agent, or Firm*—Westerman, Hattori, Daniels & Adrian, LLP.

(57) ABSTRACT

A projection type video display apparatus in which a display device transmits light emitted from a light source to project a video written into the display device is characterized by comprising person detection means for detecting a person who exists within a projected video area, and control means for changing the state of the projected video when the person detection means detects the person.

6 Claims, 18 Drawing Sheets

PROJECTION TYPE VIDEO DISPLAY APPARATUS

BACKGROUND OF THE INVENTION

1. Field of the Invention

The present invention relates to a projection type video display apparatus such as a liquid crystal projector.

2. Description of the Background Art

[1] An example of a projection type video display apparatus is one comprising distance detection means for detecting the distance between a person who exists within a projected video area (within an optical path of projected light) and the projection type video display apparatus to prevent the person from feeling dazzling by adjusting the amount of projected light when the distance detection means detects that the person exists in the vicinity of the projection type video display apparatus. The distance detection means is composed of a light receiving element (an optical sensor), to presume the distance between the person and the projection type video display apparatus by the amount of light reflected from the person that has been received by the light receiving element (see JP-A-6-347748).

In the projected video area, however, even when the person is at a position spaced apart from the projection type video display apparatus, the person feels dazzling when he or she looks toward the projection type video display apparatus. In a conventional configuration in which the amount of projected light is adjusted only when the person exists in the vicinity of the projection type video display apparatus, the person feels uncomfortable by the projected light.

The distance between the projection type video display apparatus and a screen differs depending on the disposition of a room in which the projection type video display apparatus is employed. When the distance between the projection type video display apparatus and the screen becomes extremely short, the amount of the light received in the light receiving element may, in some cases, be increased even when no person exists within the projected video area. As a result, it is erroneously detected that the person exists in the vicinity of the projection type video display apparatus irrespective of the fact that no person exists within the projected video area, so that the amount of the projected light is adjusted. Therefore, a person who is watching a video feels uncomfortable by a sudden change in the amount of the projected light.

An object of the present invention is to provide a projection type video display apparatus capable of making it possible to prevent a person who exists within a projected video area from feeling uncomfortable as well as to also prevent a person who is watching a video from feeling uncomfortable.

[2] Known as a projection type video display apparatus is one comprising a CCD camera for imaging a projected video area, character position detection means for detecting position information relating to a person who exists within the projected video area from imaging information obtained by the CCD camera, and video light luminance adjustment means for determining a luminance adjustment area on the basis of the position information from the character position detection means, and so adapted that in a case where the person exists within the projected video area, its state is detected by the imaging information from the CCD camera, and the luminance of video light is adjusted only with respect to the area where the person exists to prevent the person who exists within the projected video area from feeling dazzling (see JP-A-2000-305481).

However, the imaging information obtained by the CCD camera includes not only information relating to a person who stands in front of a screen of the projection type video display apparatus to make a presentation but also information relating to a person who is projected as a character on a video because the person appears in a film or the like. As a result, every time the person who appears in the film is projected as the character on the video, the luminance of video light around the character is changed irrespective of the fact that no person exists in front of the projection type video display apparatus, so that a person who is watching the film feels uncomfortable.

Considered in order to solve this problem is a configuration in which there is provided person detection means for detecting the heat of a person to detect the existence of the person. Although in this configuration, the existence of the person can be detected, however, the position where the person exists cannot be detected. Not only an area where the person exists but also the luminance of the whole of a video is changed, so that a person who is watching a film or the like feels uncomfortable.

An object of the present invention is to provide a projection type video display apparatus capable of reliably detecting a person who exists within a projected video area of a projection type video display apparatus as well as detecting the position of the person who exists within the projected video area, and capable of preventing the person who exists within the projected video area and a person who is watching a video from the projection type video display apparatus from feeling uncomfortable.

SUMMARY OF THE INVENTION

In a projection type video display apparatus in which a display device transmits light emitted from a light source to project a video written into the display device, a first projection type video display apparatus according to the present invention is characterized by comprising person detection means for detecting a person who exists within a projected video area; and control means for changing the state of the projected video when the person detection means detects the person.

According to the first projection type video display apparatus, when the person exists within the projected video area, the state of the video is changed, thereby allowing a dazzling impression on the person who exists within the projected video area to be reduced.

It is preferable that the first projection type video display apparatus may be provided with means for changing a detection range of the person detection means depending on the change in a range of the video projected from the projection type video display apparatus. This allows the person detection range of the person detection means to be adjusted depending on the change in the projected video range, so that the person who exists within the projected video area can be reliably detected.

An example of the control means is one for superimposing a black signal on a video signal when the person detection means detects the person. When the control means is used, the projected video becomes black when the person exists within the projected video area, thereby allowing a dazzling impression on the person who exists within the projected video area to be reduced.

An example of the control means is one for reducing the brightness of the projected video when the person detection means detects the person. When the control means is used, the brightness of the video is lowered when the person exists within the projected video area, thereby allowing a dazzling impression on the person who exists within the projected video area to be reduced.

An example of the control means is one for lowering the illuminance of the light from the light source when the person detection means detects the person. When the control means is used, the illuminance of the light from the light source is lowered when the person exists within the projected video area, thereby allowing a dazzling impression on the person who exists within the projected video area to be reduced.

There may be provided a diaphragm mechanism for adjusting the amount of the light from the light source, and usable as the control means may be one operating the diaphragm mechanism to lower the illuminance of the light from the light source when the person detection means detects the person. When the control means is used, the illuminance of the light from the light source is lowered by the diaphragm mechanism when the person exists within the projected video area, thereby allowing a dazzling impression on the person who exists within the projected video area to be reduced.

There may be provided a shutter mechanism, capable of being opened or closed, for shutting off the light from the light source, and usable as the control means may be one operating the shutter mechanism to lower the illuminance of the light from the light source when the person detection means detects the person. When the control means is used, the illuminance of the light from the light source is lowered by the shutter mechanism when the person exists within the projected video area, thereby allowing a dazzling impression on the person who exists within the projected video area to be reduced.

It is preferable that the control means comprises means for returning the state of the video into the original state after an elapse of a predetermined time period from the time point where the state of the video is changed. In this case, it is preferable that the control means comprises means for displaying, during an elapsed time period from the time point where the state of the video is changed until the state of the video is returned to the original state, the elapse time period.

Consequently, the state of the video is automatically returned to the original state after an elapse of the predetermined time period from the time point where the state of the video is changed, so that a person who is watching the video can watch the video in the most suitable state again. Further, the person who is watching the video can easily confirm the time period elapsed from the time when the state of the video is changed until the state of the video is returned to the original state can be easily confirmed.

In a projection type video display apparatus in which a display device transmits light emitted from a light source to project a video written into the display device, a second projection type video display apparatus according to the present invention is characterized by comprising a plurality of person detectors respectively corresponding to a plurality of small areas obtained by dividing a projected video area for detecting persons who are positioned in the small areas; and control means for changing, when any of the person detectors detects the person, the state of the video within the small area corresponding to the person detector that has detected the person.

According to the second projection type video display apparatus, a dazzling impression on the person who exists within the projected video area can be reduced. Further, a video signal can be changed only within a range in which the person exists, thereby making it possible to reduce interference with a presentation.

An example of the control means is one for superimposing a black signal on a video signal, to change the state of the video.

An example of the control means is one for thinning the video, to change the state of the video.

In a projection type video display apparatus in which a display device transmits light emitted from a light source to project a video written into the display device, a third projection type video display apparatus according to the present invention is characterized by comprising a plurality of person detectors for respectively detecting persons who exist in a plurality of small areas obtained by dividing a projected video area, person detection means for judging whether or not the person is detected and judging, when the person is detected, the small area where the person exists on the basis of detection signals of the plurality of person detectors; and control means for changing, when the person detection means detects the person, the state of the video within the small area where the person detection means judges that the person exists.

According to the third projection type video display apparatus, a dazzling impression on the person who exists within the projected video area can be reduced. Further, a video signal can be changed only within a range in which the person exists, thereby making it possible to reduce interference with a presentation.

Examples of the plurality of person detectors are ones respectively having different detection ranges, and respective parts of the detection ranges of the adjacent person detectors are overlapped with each other. In this case, usable as the person detection means is one comprising means for judging, when only one of the person detectors detects the person, that the person exists in the small area corresponding to a range excluding the part, which is overlapped with the detection range of the person detector adjacent to the person detector that has detected the person, of the detection range of the person detector, and means for judging, when the two adjacent person detectors detect the person, that the person exists in the small area corresponding to the overlapped parts of the respective detection ranges of the two person detectors.

This allows the number of small areas for specifying the position of the person to be made larger than the number of detectors.

An example of the control means is one for superimposing a black signal on a video signal, to change the state of the video.

An example of the control means is one for thinning the video, to change the state of the video.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

[1] First Embodiment

Referring now to FIGS. 1 to 7, a first embodiment of the present invention will be described.

Figure 1:
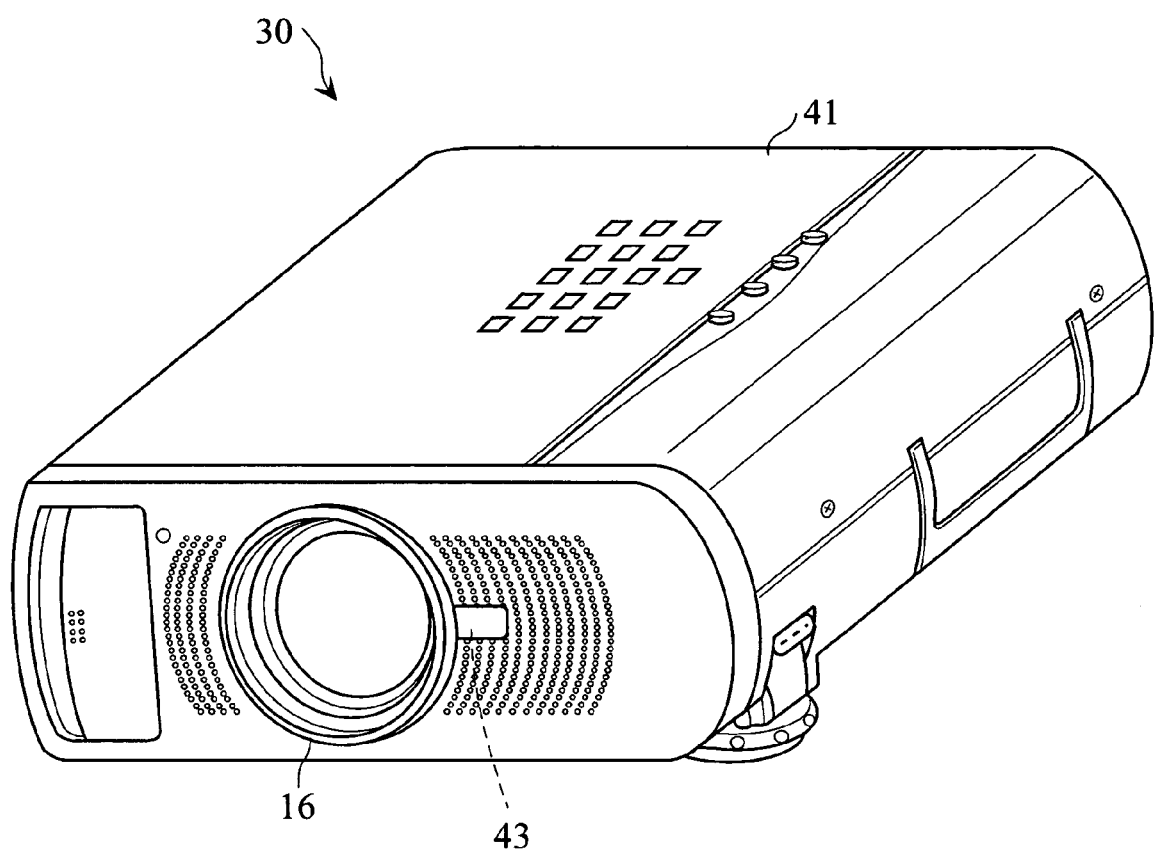
FIG. 1 is a perspective view showing the appearance of a liquid crystal projector according to a first embodiment of the present invention.

FIG. 1 is a diagram showing the appearance of a three-panel type liquid crystal projector 30.

Within a main body case 41 in the liquid crystal projector 30, an optical system 42 (see FIG. 2) leading to a projection lens 16 (see FIGS. 1 and 2) from a light source 1 (see FIG. 2), described later, is arranged.

Figure 2:
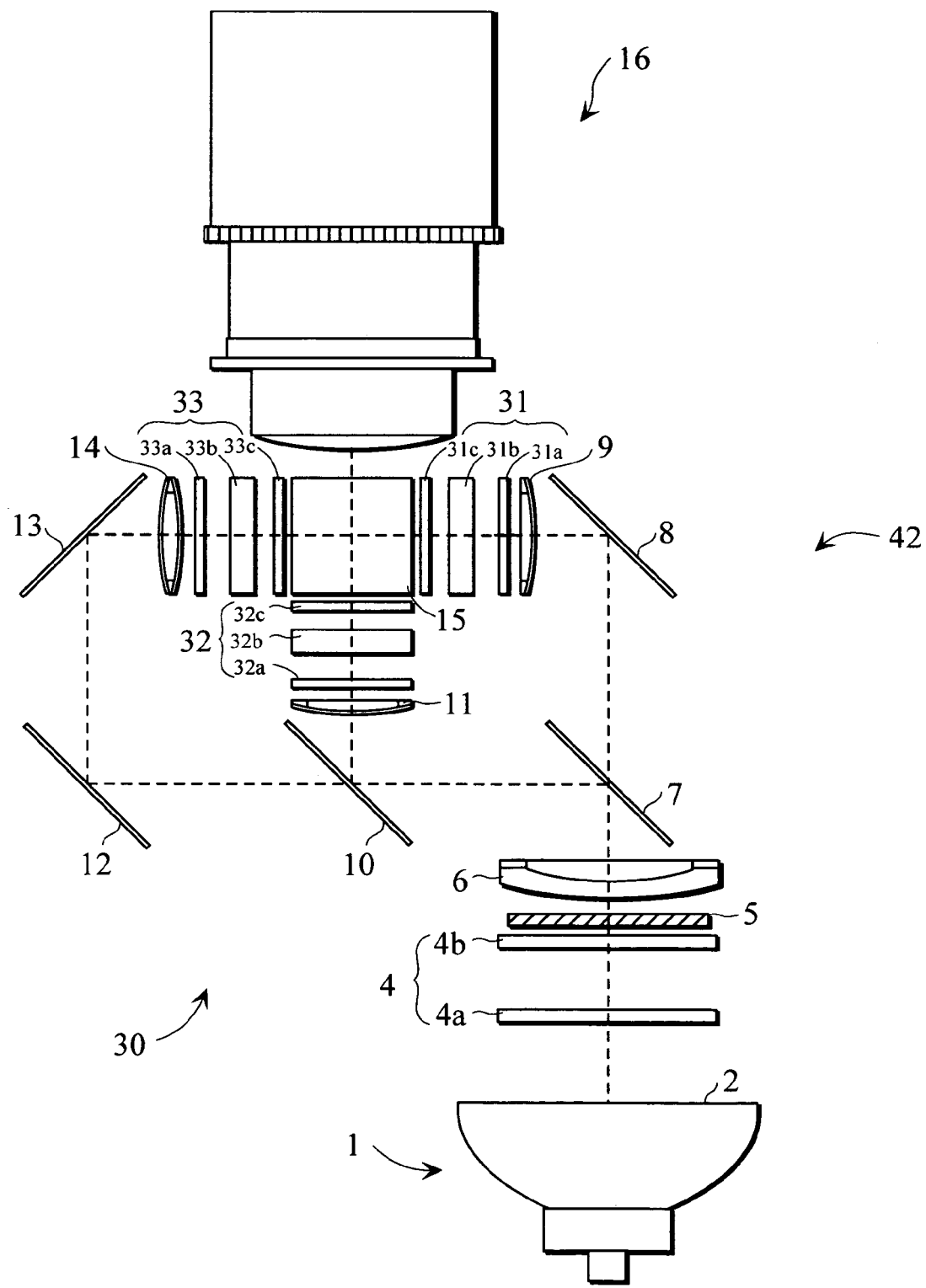
FIG. 2 is a diagram showing the configuration of an optical system in the liquid crystal projector.

FIG. 2 is a diagram showing the configuration of the optical system 42 arranged within the main body case 41.

A light emitter in the light source 1 is composed of a ultrahigh pressure mercury lamp, a metal halide lamp, a xenon lamp, etc. Light irradiated from the light emitter in the light source 1 is emitted as parallel light by a parabolic reflector 2, and is introduced into an integrator lens 4.

The integrator lens 4 comprises a pair of lens groups (fly eye lenses) 4a and 4b, and so adapted that each of lens portions introduces light emitted from the light source 1 into the whole surfaces of liquid crystal light valves 31, 32, and 33, described later. The integrator lens 4 averages partial non-uniformity in luminance existing in the light source 1, to reduce a difference in light amounts between the center and the periphery of a screen. Light that has passed through the integrator lens 4 is introduced into a first dichroic mirror 7 after passing through a polarized light conversion device 5 and a condenser lens 6.

The first dichroic mirror 7 transmits light in a red wavelength band and reflects light in a cyan (green+blue) wavelength band. The light in the red wavelength band that has been transmitted by the first dichroic mirror 7 is reflected on a reflecting mirror 8. The red light that has been reflected by the reflecting mirror 8 is optically modulated by being transmitted by the transmission-type liquid crystal light valve 31 for red light through a lens 9.

The light in the cyan wavelength band that has been reflected by the first dichroic mirror 7 is introduced into a second dichroic mirror 10. The second dichroic mirror 10 transmits light in a blue wavelength band and reflects light in a green wavelength band. The light in the green wavelength band that has been reflected by the second dichroic mirror 10 is introduced into the transmission-type liquid crystal light valve 32 for green light through a lens 11, and is optically modulated by being transmitted by the liquid crystal light valve 32.

The light in the blue wavelength band that has been transmitted by the second dichroic mirror 10 is introduced into the transmission-type liquid crystal light valve 33 for blue light through a total reflecting mirror 12, a total reflecting mirror 13, and a lens 14, and is optically modulated by being transmitted by the liquid crystal light valve 33.

The liquid crystal light valves 31, 32, and 33 respectively comprise incidence-side polarizing plates 31a, 32a, and 33a, panels 31b, 32b, and 33b constructed by sealing a liquid crystal between a pair of glass substrates (having a pixel electrode and an orientation film formed therein), and emission-side polarizing plates 31c, 32c, and 33c.

Modulated lights (video lights in respective colors) respectively modulated by passing through the liquid crystal light valves 31, 32, and 33 are synthesized by a cross dichroic prism 15, to be color video light. The color video light is projected in an enlarged manner by the projection lens 16, and is displayed on a screen 40 (see FIG. 3).

Figure 3:
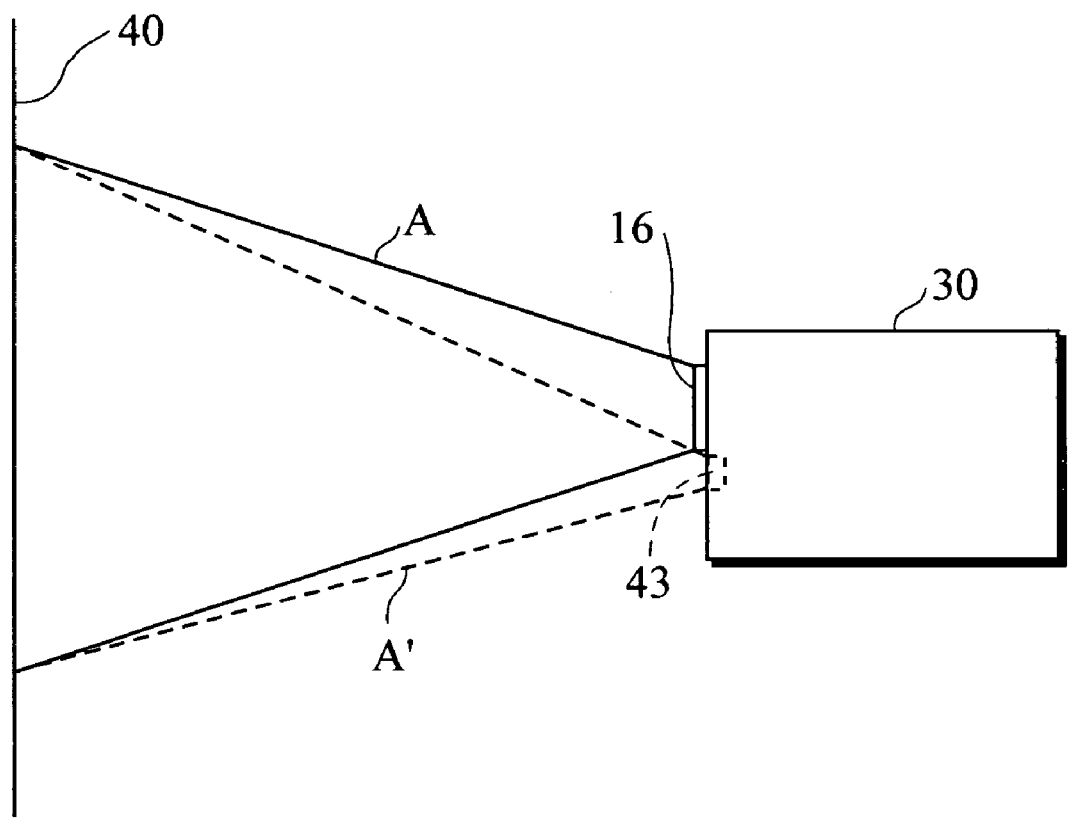
FIG. 3 is an upper view showing a state where the liquid crystal projector is employed.

As shown in FIG. 1, a person detection sensor 43 serving as person detection means for detecting the existence of a person is arranged on a front surface of the main body case 41 in the liquid crystal projector 30. The person detection sensor 43 is composed of a pyroelectric infrared sensor. As shown in FIG. 3, a range A' in which the person detection sensor 43 detects a person (a person detection range A' of the person detection sensor 43) is so set as to almost coincide with a range A of a video projected from the projection lens 16.

Figure 4:
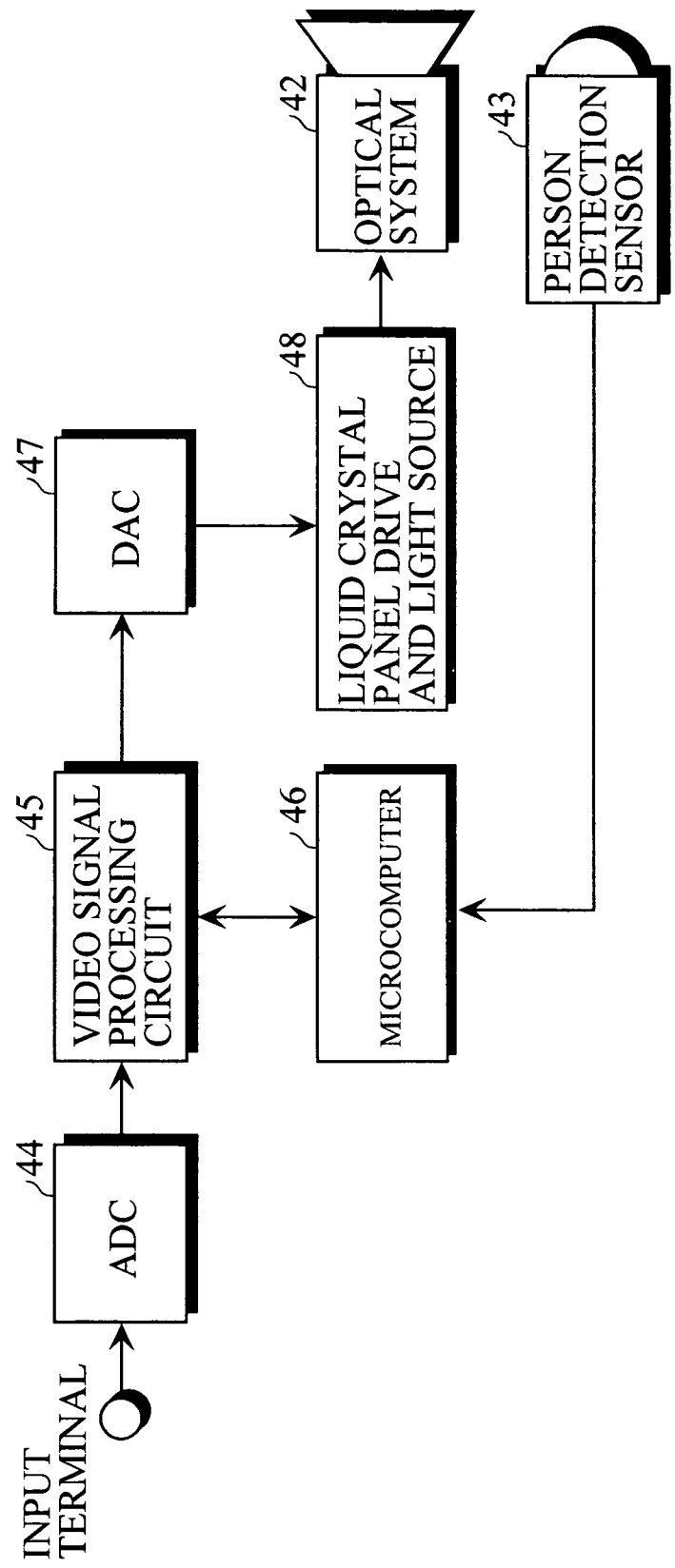
FIG. 4 is a block diagram showing a signal processing system in the liquid crystal projector.

FIG. 4 illustrates the configuration of a signal processing circuit provided in the liquid crystal projector 30.

An analog video signal from a VCR, a personal computer, or the like is inputted to an input terminal. The analog video signal is converted into a digital video signal by an ADC (A/D Converter) circuit 44. The digitized video signal is fed to a video signal processing circuit 45. The video signal processing circuit 45 has the function of superimposing an OSD (On Screen Display) signal stored in a flash memory (not shown) on the video signal by an instruction issued from a microcomputer 46 to change the color of the video signal.

The digital video signal obtained by the video signal processing circuit 45 is converted into an analog video signal by a DAC (D/A Converter) circuit 47. The analog video signal obtained by the DAC circuit 47 is written into the liquid crystal panels 31, 32, and 33 within a liquid crystal panel drive and light source 48. A video written into the liquid crystal panels 31, 32, and 33 is projected on the screen 40 through the projection lens 16 by the light from the light source 1 within the liquid crystal panel drive and light source 48.

The person detection sensor 43 outputs, when it detects a person, a detection signal at an H level to an I/O (Input-Output) port of the microcomputer 46 for a predetermined time period. The person detection sensor 43 outputs, when it does not detect a person, a detection signal at an L level to the I/O port of the microcomputer 46.

Figure 5:
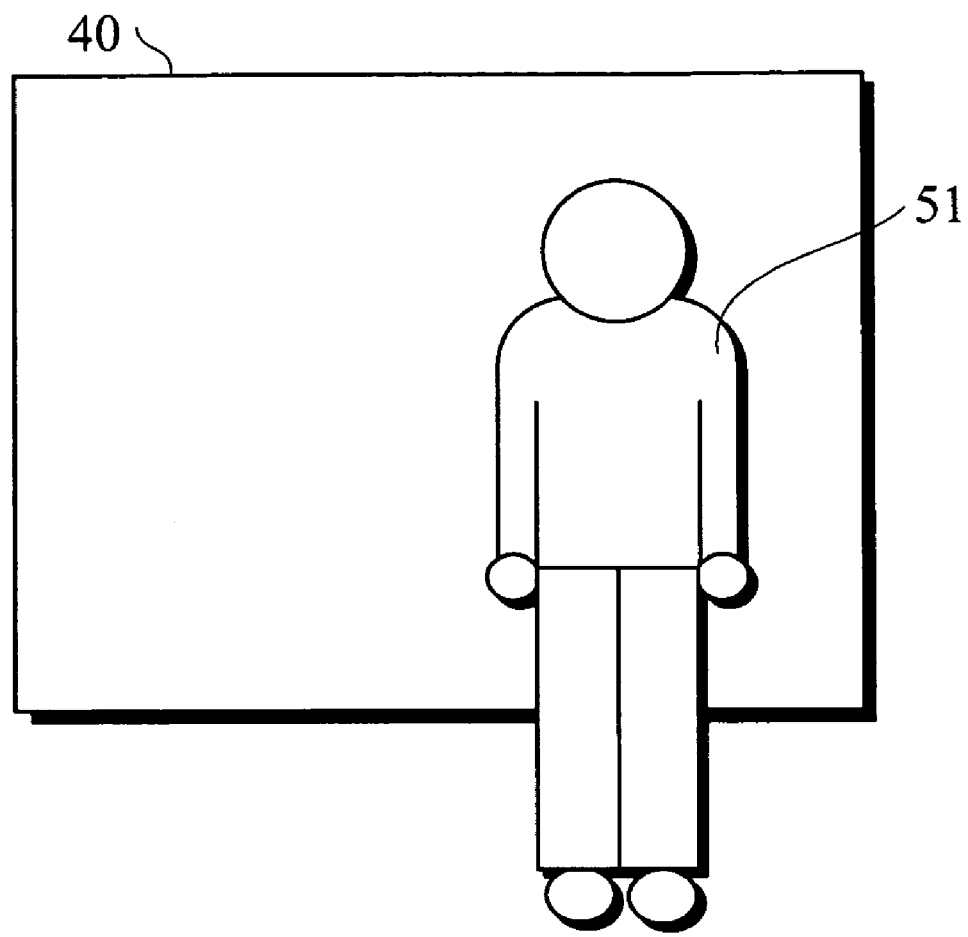
FIG. 5 is a front view showing a screen of the liquid crystal projector.
Figure 5:
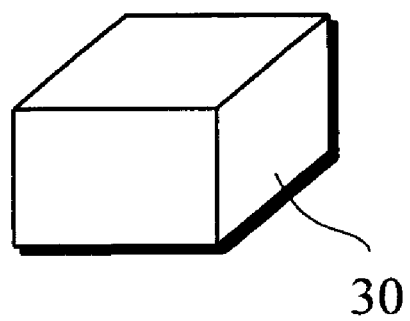

As shown in FIG. 5, when a person 51 exists within a projected video area of the liquid crystal projector 30, the person 51 is detected by the person detection sensor 43. When the person 51 is detected by the person detection sensor 43, the microcomputer 46 superimposes a black OSD signal on the video signal by the video signal processing circuit 45. As a result, the projected video becomes black, thereby making it possible to reduce a dazzling impression on the person 51 who exists within the projected video area.

When the person who exists within the projected video area is detected by the person detection sensor 43, the illuminance of the video may be lowered by the function of the microcomputer 46. Even by such a configuration, a dazzling impression on the person who exists within the projected video area can be reduced.

Figure 6:
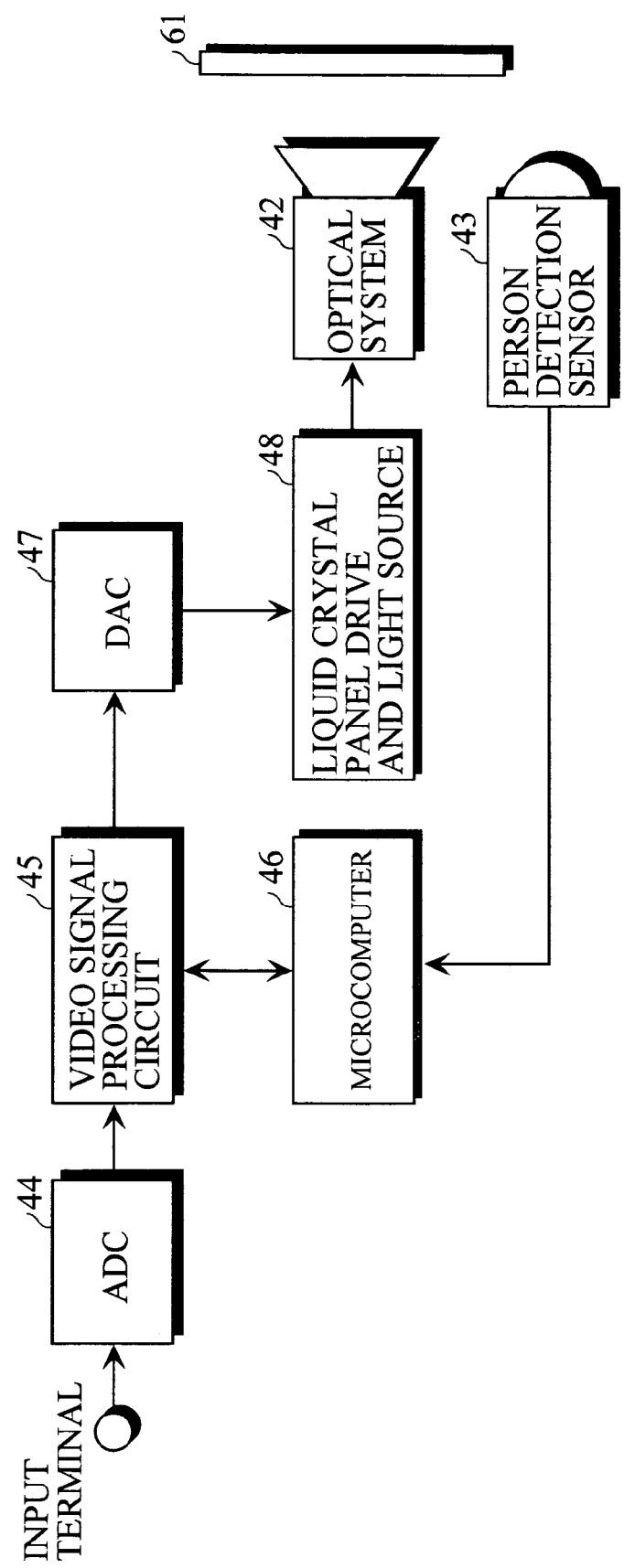
FIG. 6 is a block diagram showing a signal processing system in another form of the liquid crystal projector.

Considered as a method of lowering the illuminance of the video is a method of lowering a voltage applied to the light source 1 to lower the illuminance of light from the light source 1, a method of operating a diaphragm mechanism (not shown) provided in the optical system 42 to lower the illuminance of light from the light source 1, a method of operating a shutter mechanism 61 provided between the optical system 42 and the screen 40 to lower the illuminance of light from the light source 1, as shown in FIG. 6, or the like. The shutter mechanism 61 may be arranged within the optical system 42.

Figure 7:
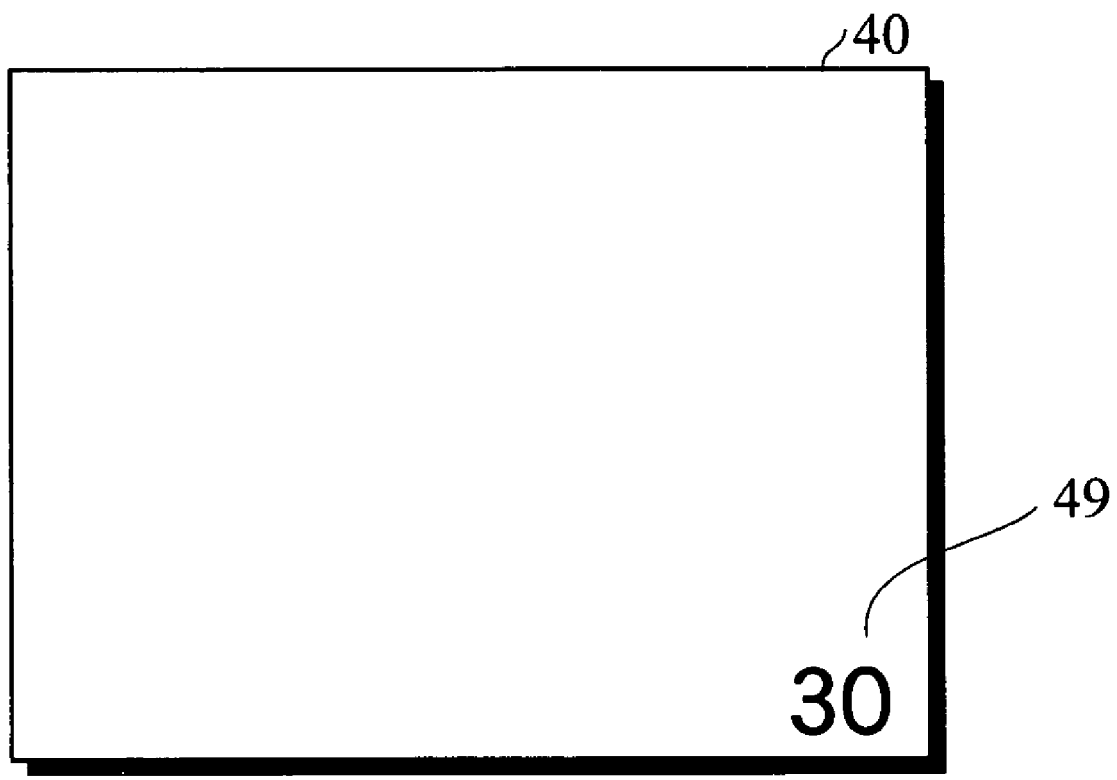
FIG. 7 is a front view showing a state where a timer display is provided on a screen of the liquid crystal projector.

The microcomputer 46 may start, when the state of the projected video is changed on the basis of the detection of the person who exists within the projected video area by the person detection sensor 43, a timer for measuring a predetermined time period to return the state of the video to the original state when the predetermined time period has elapsed. In this case, it is preferable that a timer display 49 is provided on the screen 40, as shown in FIG. 7. In the first embodiment of the present invention, the predetermined time period is set to 30 seconds, and a time period is displayed in a count-down form from 30 seconds in the timer display 49. By this configuration, a time period elapsed until the state of the video is returned to the original state can be easily confirmed. In order to return the state of the video into the original state after an elapse of a predetermined time period since the state of the video was changed, a person who has been watching the video can watch the video in the most suitable state again.

Although in the first embodiment, the person detection sensor is composed of an infrared sensor, the present invention is not limited to this configuration. For example, a difference in reflection patterns may be detected by the presence or absence of the existence of a person using a ultrasonic sensor to detect the existence of a person. In addition thereto, any sensor capable of detecting a person may be used.

Although in the above-mentioned first embodiment, the black color is superimposed on the video signal or the illuminance of the video is lowered when the person detection sensor 43 detects the person, an OSD signal previously set may be displayed on the screen 40.

Although in the first embodiment, an example in which the present invention is applied to the liquid crystal projector using the liquid crystal panel is illustrated, the present invention can be also applied to a projection type video display apparatus comprising another video light production system. The present invention can be also applied to a rear projection type video display apparatus in addition to a front projection type video display apparatus. Further, the present invention can be also applied to a DLP (Digital Light Processing) (trademark of Texas Instruments (TI) Incorporated) projector.

[2] Second Embodiment

Referring now to FIGS. 8 to 11, a second embodiment of the present invention will be described.

The second embodiment is approximately the same as the first embodiment except that a projected video range is variable and a person detection range of a person detection sensor 43 is adjustable.

Figure 8:
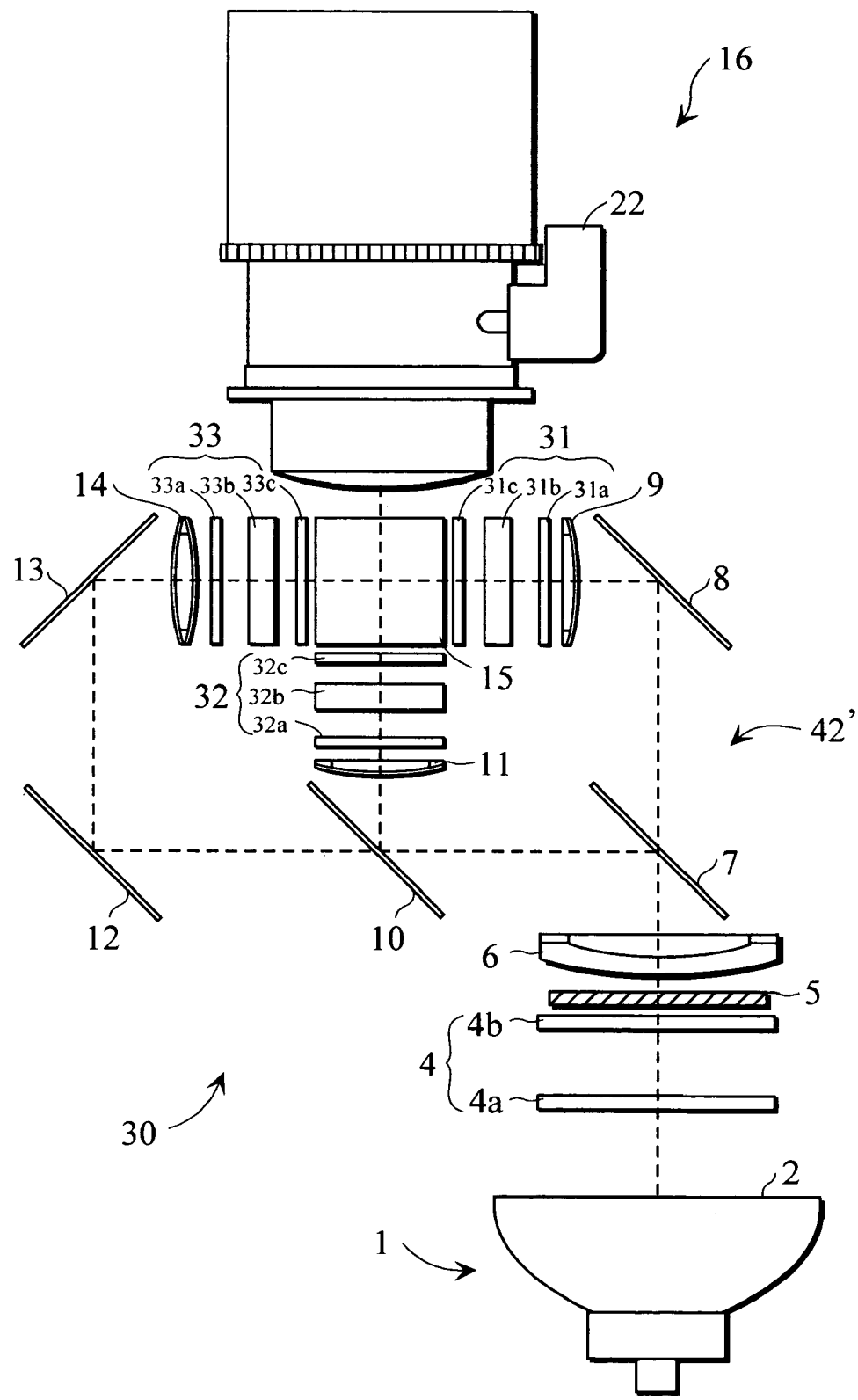
FIG. 8 is a diagram showing the configuration of an optical system in a liquid crystal projector according to a second embodiment of the present invention.

FIG. 8 illustrates the configuration of an optical system 42' arranged within a main body case 41. In FIG. 8, the same components as those shown in FIG. 2 are assigned the same reference numerals and hence, the description thereof is not repeated.

Although the projection lens 16 is fixed in the first embodiment, a projection lens 16 in the second embodiment comprises a lens driving motor 22 for moving the projection lens 16 back and forth in order to enlarge or reduce a projected video.

Figure 10:
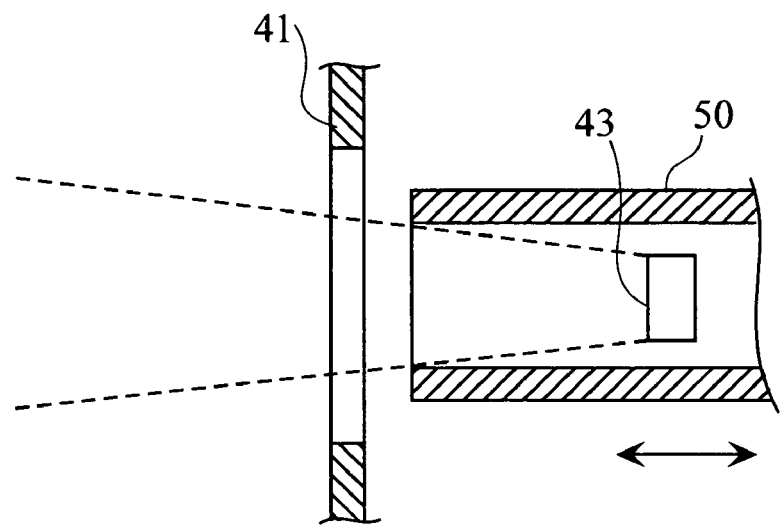
FIG. 10 is a diagram showing the configuration of a person detection sensor in the liquid crystal projector, showing a state where a cylinder is moved forward.
Figure 11:
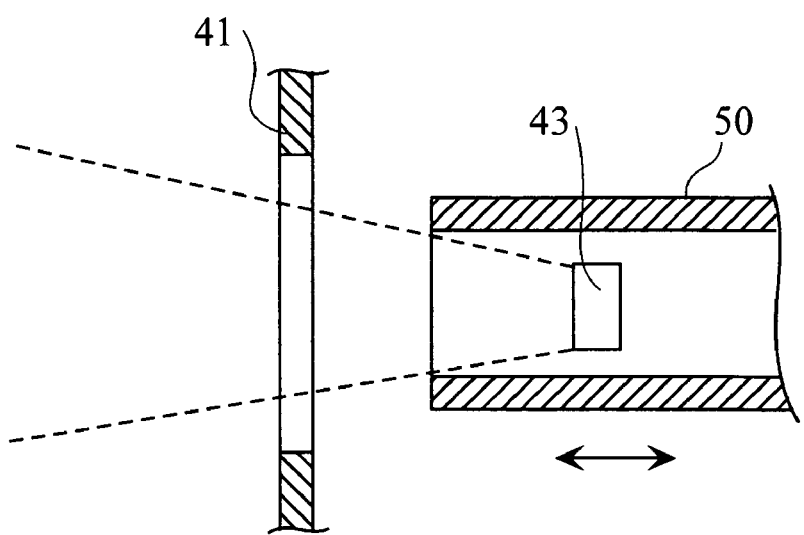
FIG. 11 is a diagram showing the configuration of a person detection sensor in the liquid crystal projector, showing a state where a cylinder is moved backward.

As shown in FIGS. 10 and 11, the person detection sensor 43 is covered with a cylinder 50 held so as to be movable back and forth in the main body case 41. In order to make it possible to adjust the person detection range of the person detection sensor 43, the cylinder 50 is moved back and forth by driving means (not shown).

Figure 9:
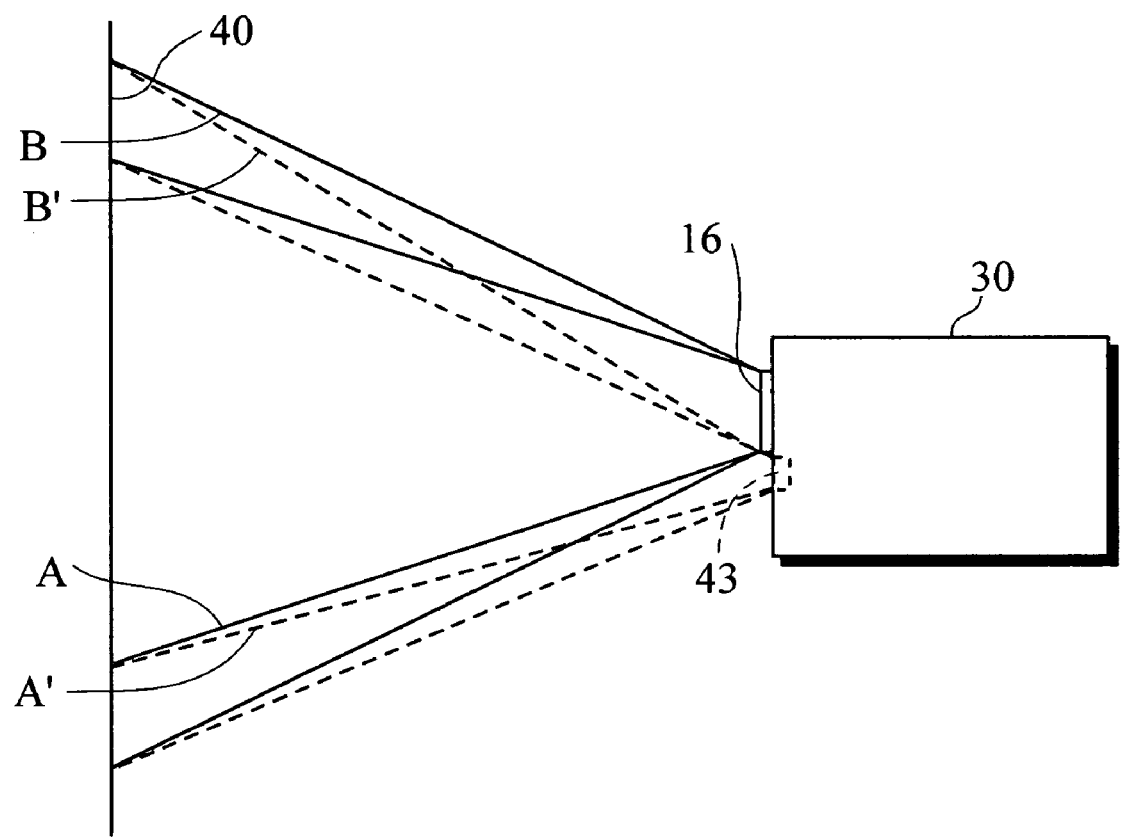
FIG. 9 is an upper view showing a state where the liquid crystal projector is employed.

As shown in FIG. 9, the projection lens 16 is moved back and forth so that a range of a video projected on a screen 40 is changed. When the person detection range of the person detection sensor 43 is fixed, therefore, in a case where a projected video range is enlarged by driving the lens driving motor 22, for example, the person detection sensor 43 cannot detect, even if a person exists within the enlarged projected video range, the existence of the person. Therefore, the person may, in some cases, feel uncomfortable by projected light.

On the other hand, in the second embodiment of the present invention, the person detection range of the person detection sensor 43 is made adjustable, to change the person detection range of the person detection sensor 43 depending on the change in the projected video range, as shown in FIGS. 9 to 11. FIGS. 10 and 11 respectively show a state where the cylinder 50 covering the person detection sensor 43 is at a front position and a rear position.

In FIG. 9, when the lens driving motor 22 is driven to enlarge the projected video range from A to B, the cylinder 50 is moved backward to enlarge the person detection range of the person detection sensor 43 from A' to B' approximately equal to a projected video range B. At this time, the movement amount of the cylinder 50 is adjusted depending on the number of revolutions of the lens driving motor 22, that is, the amount of movement of the projection lens 16 by the lens driving motor 22. As a result, the person detection range of the person detection sensor 43 can be adjusted depending on the change in the projected video range, and the person who exists within the projected video range can be reliably detected.

Although in the second embodiment, the cylinder 50 covering the person detection sensor 43 is moved back and forth to adjust the person detection range of the person detection sensor 43, the person detection range of the person detection sensor 43 may be adjusted by moving the person detection sensor 43 back and forth.

[3] Third Embodiment

Referring now to FIGS. 12 to 23, a third embodiment of the present invention will be described.

Figure 12:
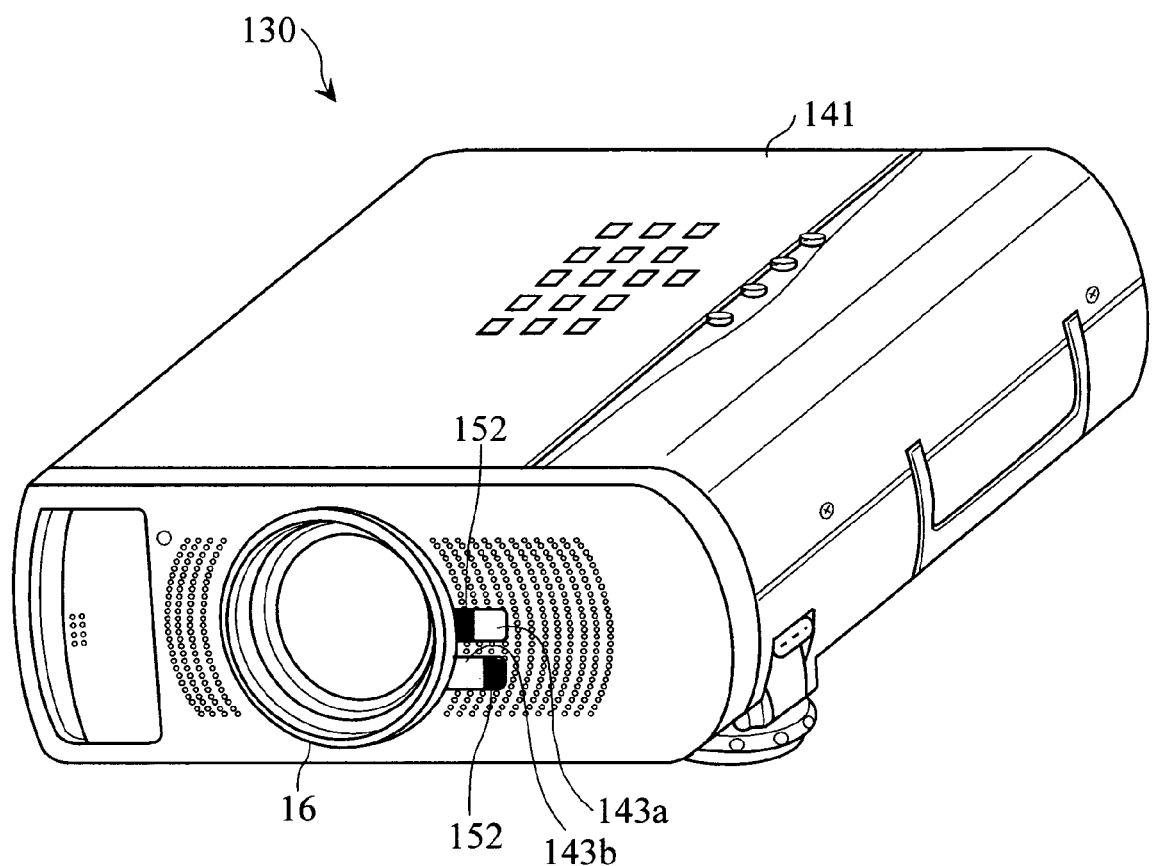
FIG. 12 is a perspective view showing the appearance of a liquid crystal projector according to a third embodiment of the present invention.

FIG. 12 is a diagram showing the appearance of a three-panel type liquid crystal projector 130.

Within a main body case 141 in the liquid crystal projector 130, an optical system 142 leading to a projection lens 16 (see FIGS. 12 and 13) from a light source 12 (see FIG. 13), described later, is arranged.

Figure 13:
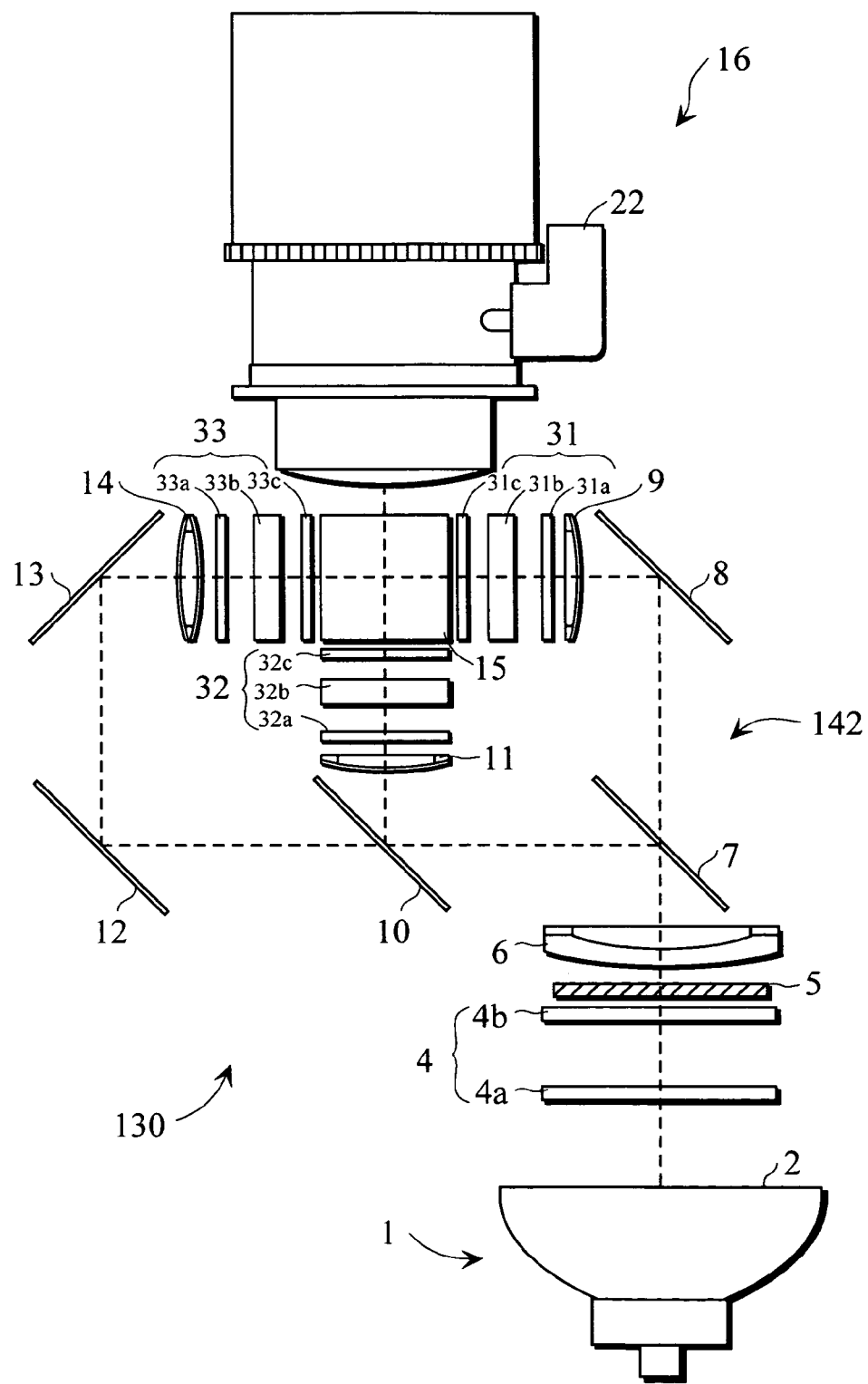
FIG. 13 is a diagram showing the configuration of an optical system in the liquid crystal projector.

FIG. 13 is a diagram showing the configuration of the optical system 142 arranged within the main body case 141. In FIG. 13, the same components as those shown in FIG. 2 are assigned the same reference numerals and hence, the description thereof is not repeated.

Also in the third embodiment, a projection lens 16 comprises a lens driving motor 22 for moving the projection lens 16 back and forth in order to enlarge or reduce a projected video, as in the second embodiment.

As shown in FIG. 12, person detection sensors 143a and 143b serving as person detection means for detecting a person are provided side by side in the vertical direction on a front surface of the main body case 141 in the liquid crystal projector 130. Each of the person detection sensors 143a and 143b is composed of a pyroelectric infrared sensor, and has the performance of being able to detect the whole of a screen 140 (see FIG. 18).

Approximately one-third at the left of a detection surface of the one person detection sensor (first person detection sensor) 143a is covered with a light shielding member 152 such as high-density polyethylene for shutting off infrared rays. Approximately one-third at the right of a detection surface of the other person detection sensor (second person detection sensor) 143b is covered with a light shielding member 152 such as high-density polyethylene for shutting off infrared rays.

Figure 15:
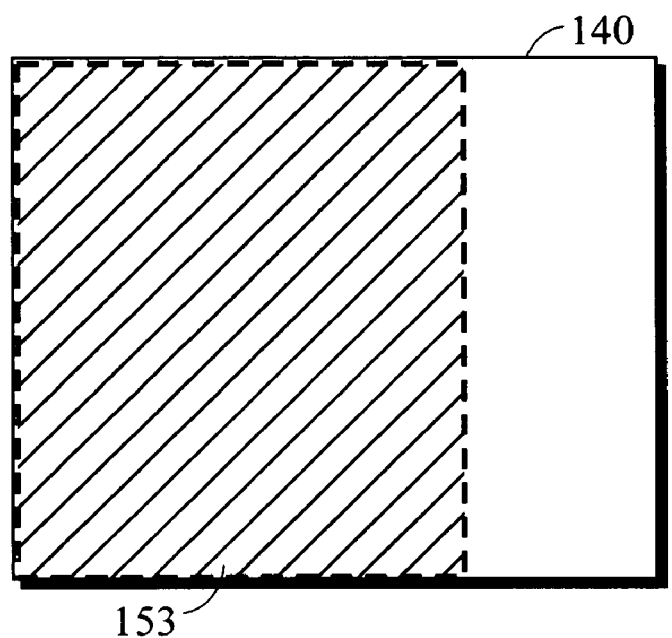
FIG. 15 is a diagram showing a detection range on a screen of a first person detection sensor.
Figure 16:
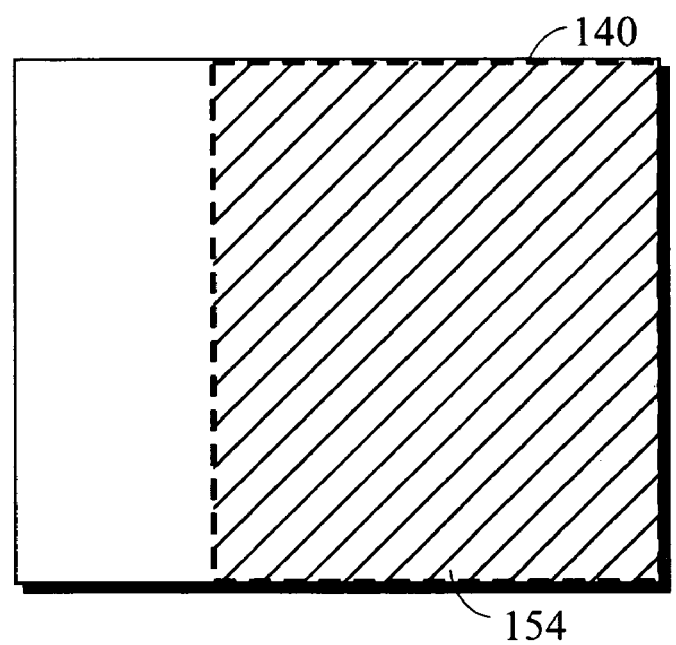
FIG. 16 is a diagram showing a detection range on a screen of a second person detection sensor.

A detection range of the first person detection sensor 143a is a range (first detection range) of projected light that is emitted from the projection lens 16 to reach a first area 153 indicated by hatching corresponding to a left half of the screen 140 and an area from the center thereof slightly to the right in a projected video area, as shown in FIG. 15. A detection range of the second person detection sensor 143b is a range (second detection range) of projected light that is emitted from the projection lens 16 to reach a second area 154 indicated by hatching corresponding to a right half of the screen 140 and an area from the center thereof slightly to the left in a projected video area, as shown in FIG. 16.

Figure 17:
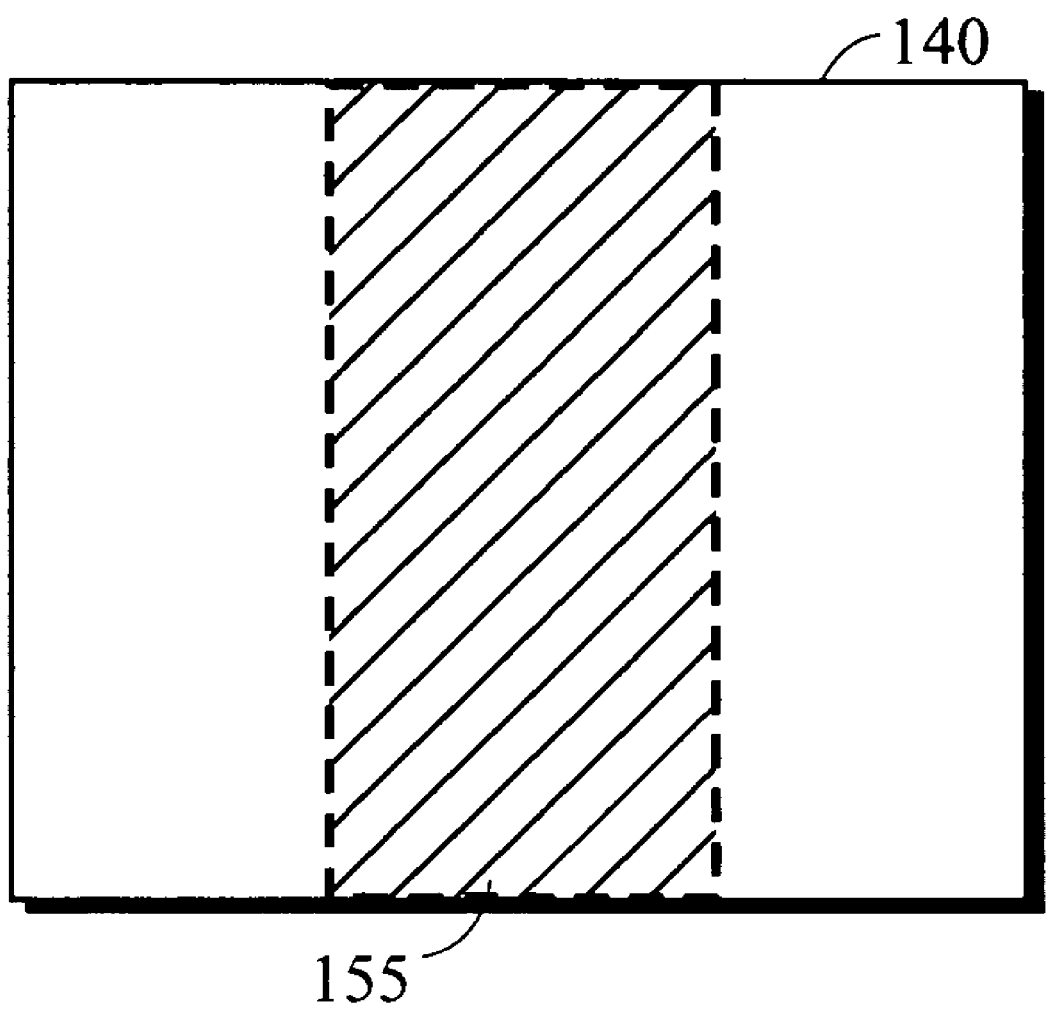
FIG. 17 is a diagram showing respective detection ranges on a screen of a first person detection sensor and a second person detection sensor.

Respective parts of the detection range (first detection range) of the first person detection sensor 143a and the detection range (second detection range) of the second person detection sensor 143b are overlapped with each other. That is, as shown in FIG. 17, a range of projected light that is emitted from the projection lens 16 to reach a range 155 indicated by hatching at the center in the width of the screen 140 in a projected video area is the overlapped parts of the first detection range and the second detection range.

Figure 14:
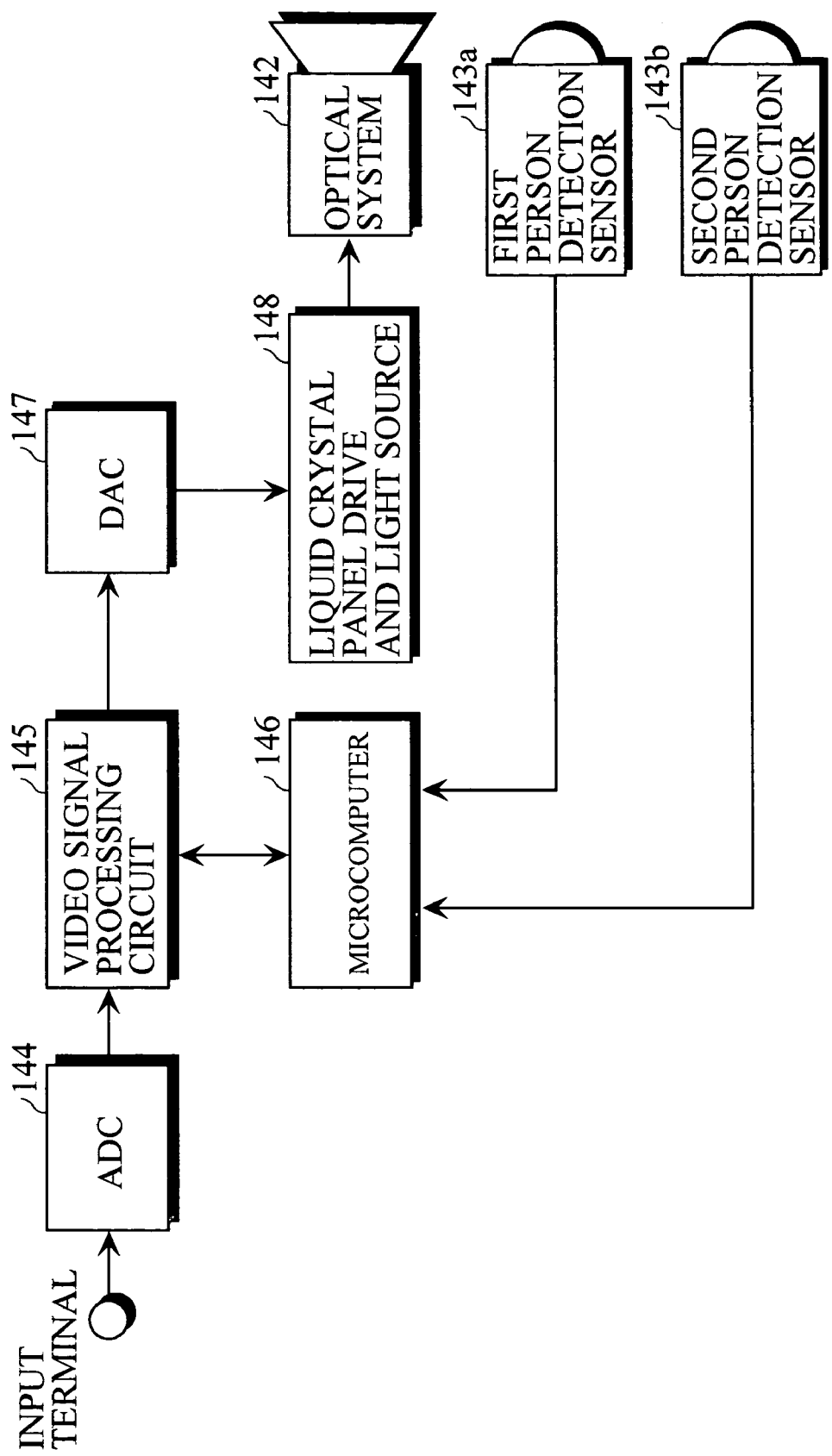
FIG. 14 is a diagram showing the configuration of a signal processing system in the liquid crystal projector.

FIG. 14 shows the configuration of a signal processing circuit provided in the liquid crystal projector 130.

An analog video signal from a VCR, a personal computer, or the like is inputted to an input terminal. The analog video signal is converted into a digital video signal by an ADC circuit 144. The digitized video signal is fed to a video signal processing circuit 145. The video signal processing circuit 145 has the function of superimposing an OSD signal stored in a flash memory (not shown) on a video signal by an instruction issued from a microcomputer 146 to change the color of the video signal.

The digital video signal obtained by the video signal processing circuit 145 is converted into an analog video signal by a DAC circuit 147. The video signal obtained by the DAC circuit 147 is written into liquid crystal panels 31, 32, and 33 within a liquid crystal panel drive and light source 148. A video written into the liquid crystal panels 31, 32, and 33 is projected on the screen 140 through the projection lens 16 by light from a light source 1 within the liquid crystal panel drive and light source 148.

Each of person detection sensors 143a and 143b outputs, when it detects a person, a detection signal at an H level for a predetermined time period to an I/O port of the microcomputer 146. Each of the person detection sensors 143a and 143b outputs, when it does not detect a person, a detection signal at an L level to the I/O port of the microcomputer 46.

Figure 18:
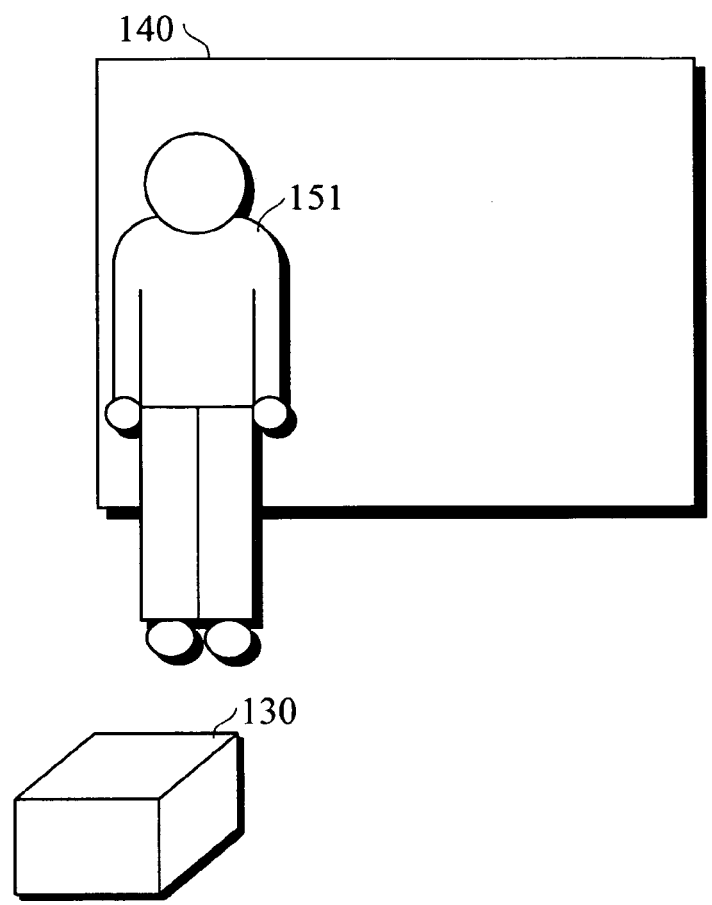
FIG. 18 is a diagram showing a state where a person stands at the left of a screen.

When a person 151 is standing at the left of and short of the screen 140 as viewed from the liquid crystal projector 130 to make a presentation or the like, as shown in FIG. 18, the first person detection sensor 145a detects the person 151, while the second person detection sensor 143b does not detect the person 151. That is, out of respective detection signals of the first person detection sensor 143a and the second person detection sensor 143b, only the detection signal of the first person detection sensor 143a enters an H level.

In this case, the microcomputer 146 controls the video signal processing circuit 145, to superimpose a black OSD signal on a video signal corresponding to a range excluding a lower part of a left side portion corresponding to approximately one-third of the size of the screen 140 as viewed from the liquid crystal projector 130 (a range in which only the first person detection sensor 143a can detect a person).

Figure 19:
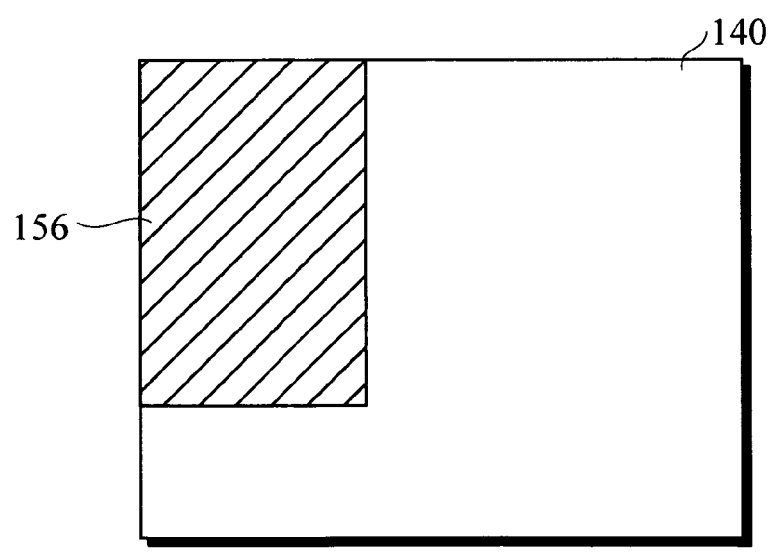
FIG. 19 is a diagram showing the state of a screen in a case where a first person detection sensor detects a person.

As a result, a projection surface 156 of projected light around at least the face of the person 151 becomes black, as shown in FIG. 19, thereby making it possible to reduce a dazzling impression on the person 151 who exists within the projected video area. Further, the video signal can be changed only in a range in which the person 151 exists, thereby making it possible to prevent the presentation from being interfered with.

The reason why the projection surface 156 on which a black color is projected by superimposing the black OSD signal on the video signal is not the whole position where the person 151 exists but the range excluding the lower part in FIG. 19 is that the black OSD signal need not be superimposed on the lower part because the lower part is not the position of a line of sight of the person 151. The reason for this is that an area where the black OSD signal is superimposed on the video signal is reduced to alleviate a visually undesirable feeling of an image as much as possible.

Figure 20:
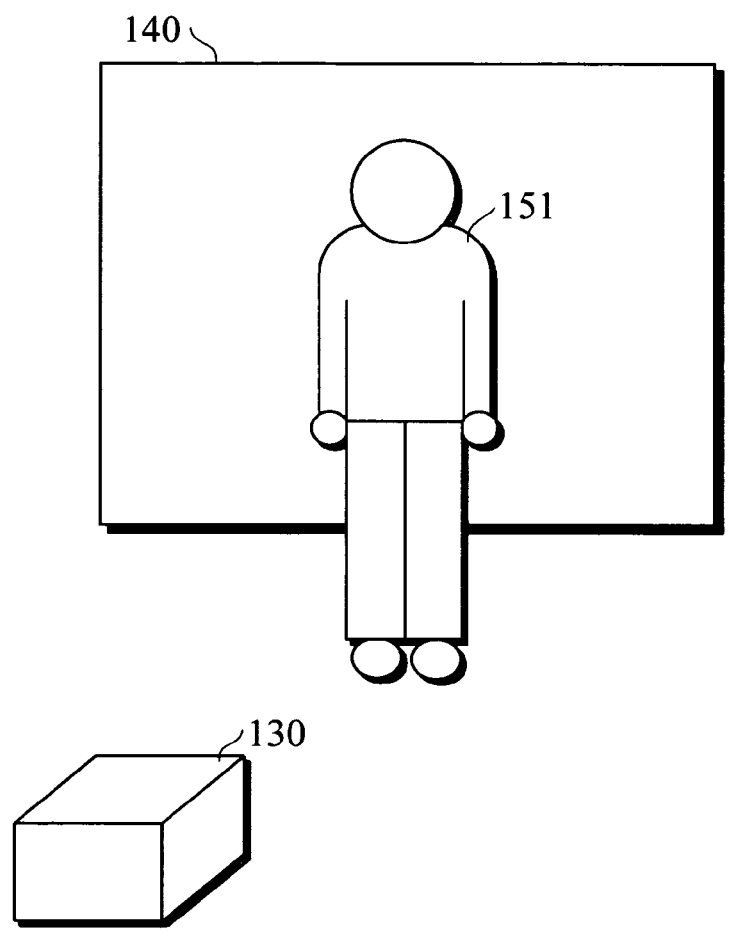
FIG. 20 is a diagram showing a state where a person stands at the center of a screen.

When the person 151 is standing at the center in the vertical direction of and short of the screen 140 to make a presentation or the like, as shown in FIG. 20, both the first person detection sensor 143a and the second person detection sensor 143b detect the person 151. That is, both respective detection signals of the first person detection sensor 143a and the second person detection sensor 143b enter an H level.

Figure 21:
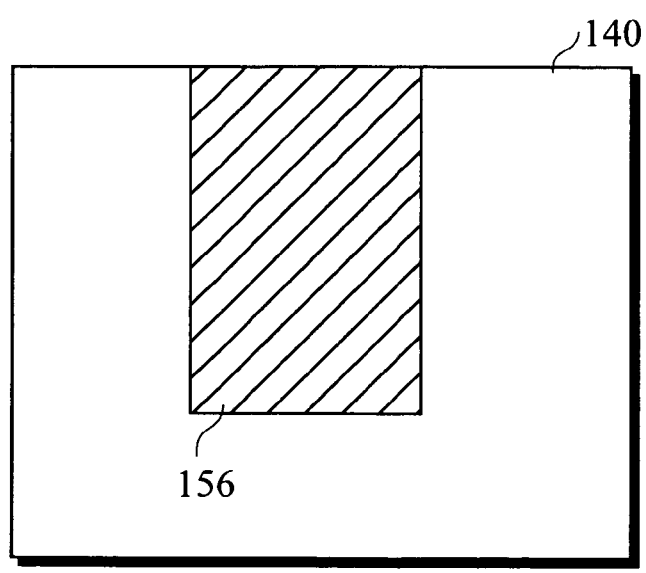
FIG. 21 is a diagram showing the state of a screen in a case where a first person detection sensor and a second person detection sensor detect a person.

In this case, the microcomputer 146 controls the video signal processing circuit 145, to superimpose a black OSD signal on a video signal corresponding to a range excluding a lower part of a central portion in the horizontal direction corresponding to approximately one-third of the size of the screen 140. As a result, a projection surface 156 of projected light around at least the face of the person 151 becomes black, as shown in FIG. 21, thereby making it possible to reduce a dazzling impression on the person 151 who exists within the projected video area. Further, the video signal can be changed only in a range in which the person 151 exists, thereby making it possible to prevent the presentation from being interfered with.

The reason why the projection surface 156 on which a black color is projected by superimposing the black OSD signal on the video signal is not the whole position where the person 151 exists but the range excluding the lower part in FIG. 20 is that the black OSD signal need not be superimposed on the lower part because the lower part is not the position of a line of sight of the person 151. The reason for this is that an area where the black OSD signal is superimposed on the video signal is reduced to alleviate a visually undesirable feeling of an image as much as possible.

Figure 22:
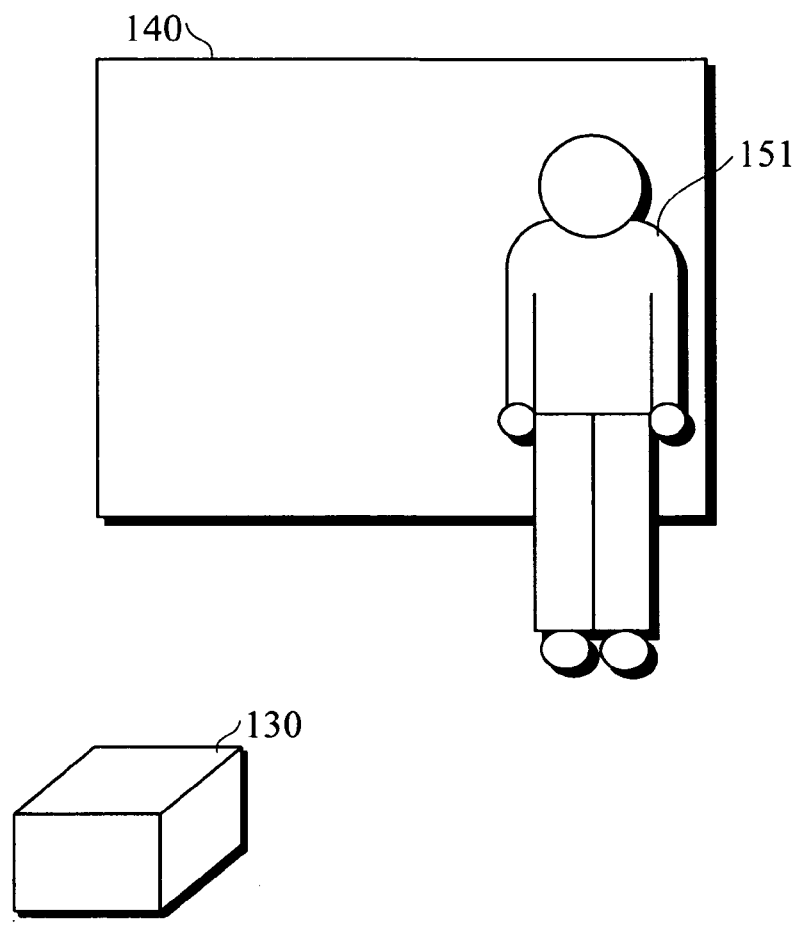
FIG. 22 is a diagram showing a state where a person stands at the right of a screen.

When the person 151 is standing at the right of and short of the screen 140 as viewed from the liquid crystal projector 130 to make a presentation or the like, as shown in FIG. 22, the second person detection sensor 143b detects the person 151, while the first person detection sensor 143a does not detect the person 151. That is, out of respective detection signals of the first person detection sensor 143a and the second person detection sensor 143b, only the detection signal of the second person detection sensor 143b enters an H level.

In this case, the microcomputer 146 controls the video signal processing circuit 145, to superimpose a black OSD signal on a video signal corresponding to a range excluding a lower part of a right side portion corresponding to approximately one-third of the size of the screen 140 as viewed from the liquid crystal projector 130 (a range in which only the second person detection sensor 143b can detect a person).

Figure 23:
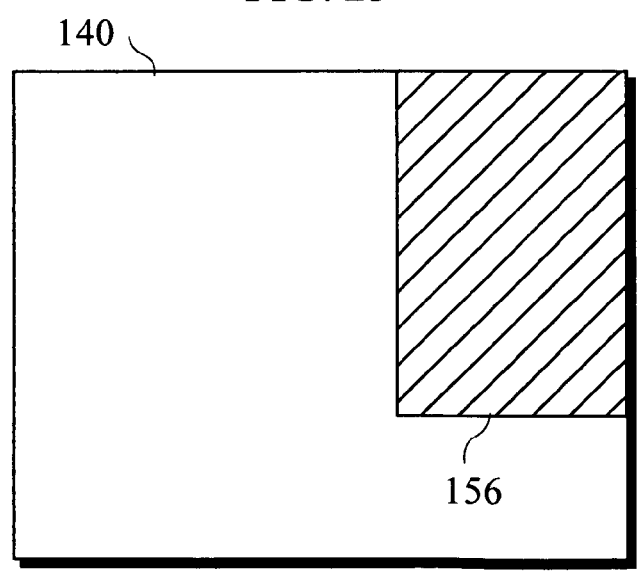
FIG. 23 is a diagram showing the state of a screen in a case where a second person detection sensor detects a person.

As a result, a projection surface 156 of projected light around at least the face of the person 151 becomes black, as shown in FIG. 23, thereby making it possible to reduce a dazzling impression on the person 151 who exists within the projected video area. Further, the video signal can be changed only in a range in which the person 151 exists, thereby making it possible to prevent the presentation from being interfered with.

The reason why the projection surface 156 on which a black color is projected by superimposing the black OSD signal on the video signal is not the whole position where the person 151 exists but the range excluding the lower part in FIG. 23 is that the black OSD signal need not be superimposed on the lower part because the lower part is not the position of a line of sight of the person 151. The reason for this is that an area where the black OSD signal is superimposed on the video signal is reduced to alleviate a visually undesirable feeling of an image as much as possible.

Respective parts of the person detection ranges of the first person detection sensor 143a and the second person detection sensor 143b are thus overlapped with each other, so that a person can be detected in three areas by the two sensors. Therefore, a range in which the state of the video is changed can be narrowed.

Although in the third embodiment, each of the person detection sensors 143a and 143b is composed of an infrared sensor, the present invention is not limited to this configuration. For example, the difference in a reflection pattern may be detected by the presence or absence of the existence of a person using a ultrasonic sensor to detect the existence of the person. In addition thereto, a plurality of any sensors capable of detecting a person may be used.

Although in the third embodiment, an example in which the present invention is applied to the liquid crystal projector using the liquid crystal panel is illustrated, the present invention can be also applied to a projection type video display apparatus comprising another video light production system. The present invention can be also applied to a rear projection type video display apparatus in addition to a front projection type video display apparatus. Further, the present invention can be also applied to a DLP projector.

Although in the third embodiment, the video is changed by superimposing the black OSD signal on the video, the present invention is not limited to this configuration. For example, within an area where a video should be changed, a dazzling impression on a person who exists within the projected video area may be reduced by thinning the video for each row or for each column to make the projected video translucent, lower the illuminance of the light source 1, or reduce light emitted from the light source 1, for example.

Although in the third embodiment, the two person detection sensors are arranged side by side in the vertical direction, they may be arranged side by side in the horizontal direction. That is, the projection type video display apparatus may be so configured that the whole screen 140 is divided to detect a person. Further, the number of person detection sensors is not limited to two. For example, an arbitrary number of person detection sensors may be arranged. Furthermore, the present invention is not limited to such a configuration that respective detection ranges of the adjacent person detection sensors are overlapped with each other.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a projection type video display apparatus in which a display device transmits light emitted from a light source to project a video written into the display device,
   the projection type video display apparatus comprising:
   a plurality of person detectors respectively corresponding to a plurality of small areas obtained by dividing a projected video area in a horizontal direction for detecting persons who are positioned in the small areas; and control means for changing, when any of the person detectors detects the person, the state of the video in a portion of the small area corresponding to the person detector that has detected the person, the portion of the small area being an area excluding a lower part of the small area.

2. In a projection type video display apparatus in which a display device transmits light emitted from a light source to project a video written into the display device, the projection type video display apparatus comprising:

a plurality of person detectors for respectively detecting persons who exist in a plurality of small areas obtained by dividing a projected video area in a horizontal direction;

person detection means for judging whether or not the person is detected and judging, when the person is detected, the small area where the person exists on the basis of respective detection signals of the plurality of person detectors; and control means for changing, when the person detection means detects the person, the state of the video in a portion of the small area where the person detection means judges that the person exists, the portion of the small area being an area excluding a lower part of the small area.

3. In a projection type video display apparatus in which a display device transmits light emitted from a light source to project a video written into the display device, the projection type video display apparatus comprising:

a plurality of person detectors for respectively detecting persons who exist in a plurality of small areas obtained by dividing a projected video area;

person detection means for judging whether or not the person is detected and judging, when the person is detected, the small area where the person exists on the basis of respective detection signals of the plurality of person detectors; and control means for changing, when the person detection means detects the person, the state of the video within the small area where the person detection means judges that the person exists, wherein the plurality of person detectors respectively have different detection ranges, and respective parts of the detection ranges of the adjacent person detectors are overlapped with each other.

4. The projection type video display apparatus according to claim 3, wherein the person detection means comprises means for judging, when only one of the person detectors detects the person, that the person exists in the small area corresponding to a range excluding the part, which is overlapped with the detection range of the person detector adjacent to the person detector that has detected the person, of the detection range of the person detector, and means for judging, when the two adjacent person detectors detect the person, that the person exists in the small area corresponding to the overlapped parts of the detection ranges of the two person detectors.

5. The projection type video display apparatus according to any one of claims 1 to 4, wherein the control means superimposes a black signal on a video signal, to change the state of the video.

6. The projection type video display apparatus according to any one of claims 1 to 4, wherein the control means thins the video, to change the state of the video.

* * * * *